United States Patent Office 2,765,327
Patented Oct. 2, 1956

2,765,327
PROCESS

Charles E. Bradley, Jr., Westport, Conn., assignor to R. T. Vanderbilt Company, Inc., New York, N. Y., a corporation of New York No Drawing. Application August 7, 1952, Serial No. 303,168

8 Claims. (Cl. 260—429)

My invention relates to a method for the preparation of manganous dimethyl dithiocarbamate.

As is disclosed in the copending application of Albert A. Somerville, Serial No. 303,148, filed of even date herewith, manganous dimethyl dithiocarbamate is a fungicide which is particularly valuable for use in the control of scab on apple trees. The compound is a water insoluble salt, and can be prepared by reacting in aqueous solution a water soluble manganous salt and an alkali metal or alkaline earth metal dimethyl dithiocarbamate. When this is done and the precipitated manganous dimethyl dithiocarbamate is simply separated from the reaction mixture by conventional means, such as filtration, and is thereafter dried, in the presence of air, it is found that the dried material is dark in color. This makes the material less useful in the spraying of apple trees in order to control scab since it leaves a dark colored residue on the fruit. In accordance with my invention, I have discovered an improved method for the preparation of manganous dimethyl dithiocarbamate which results in the production of that compound in a light tan color, so that the compound does not leave an unsightly residue on foliage and fruit when used in the spraying of apple trees.

The method which I have devised involves reacting in aqueous solution substantially equivalent amounts of an inorganic, water-soluble manganous salt and an alkali metal or alkaline earth metal dimethyl dithiocarbamate to precipitate manganous dimethyl dithiocarbamate, washing the precipitate with water until it contains less than about 0.25 percent by weight of water-soluble salts, based upon the weight of manganous dimethyl dithiocarbamate, and thereafter drying the precipitate. In accordance with my invention I have discovered that unless the manganous dimethyl dithiocarbamate is washed substantially free from water-soluble salts before it is dried the dried compound produced is dark in color.

*Example I*

In order to prepare manganous dimethyl dithiocarbamate according to the method which I have devised, the following procedure was used.

950 gallons of water at 60° C. was added to a 3800 gallon wooden tank equipped with an agitator. To this was added 416 pounds of $MnSO_4.H_2O$ which dissolved immediately under agitation, and then 2325 pounds of a 30 percent by weight aqueous solution of sodium dimethyl dithiocarbamate was run in with agitation over a period of one hour. The tank was then filled with cold water and allowed to settle for approximately eight hours. The supernatant liquid was then decanted and replaced with an equal amount of water. The mixture was then agitated and allowed to settle, after which the supernatant liquid was again decanted. This washing procedure was repeated twice more in order to bring the soluble salts down to 0.05 to 0.10 percent by weight, based upon the final dry product. The sludge was then pumped to a tank having a porous bottom covered by a filter cloth and was sucked as dry as possible using 8 to 10 inches of mercury vacuum. Thereafter, the filter cake was dried on trays at 150° F. Exposure to air of the wet, incompletely washed filter cake should be avoided, or otherwise various side reactions take place which darken the product badly.

*Example II*

The following example illustrates an embodiment of my process in which there is produced a composition composed predominantly of manganous dimethyl dithiocarbamate and which is an effective fungicide when used in the control of scab on apple trees.

950 gallons of water at 60° C. was added to a 3800 gallon wooden tank equipped with an agitator. To this was added 415 pounds of $MnSO_4.H_2O$ which dissolved immediately under agitation, and then 2325 pounds of a 30 per cent aqueous solution containing a mixture of sodium dimethyl dithiocarbamate and the sodium salt of 2-mercaptobenzothiazole in the weight ratio of 91.9:8.1. This aqueous solution was run in with agitation over a period of one hour. The tank was then filled with cold water and allowed to settle for approximately eight hours. The supernatant liquid was decanted, and the sludge remaining in the tank was washed three times with water which was removed by decantation to bring the soluble salts down to 0.05 to 0.10 percent based upon the weight of the final dry product. The sludge was then pumped to a tank having a porous bottom covered by a filter cloth and was sucked as dry as possible using a vacuum of 8 to 10 inches of mercury. The final product was prepared by drying on trays at 150° F. Here again, if the wet, incompletely washed filter cake is exposed to air various side reactions take place which darken the product badly.

Various modifications can be made in the procedures of the specific examples to provide other embodiments which fall within the scope of the process of my invention. Thus, in place of the $MnSO_4.H_2O$ there can be used an equi-molar amount of other inorganic, water-soluble manganous salts, such as $MnSO_4$, $MnSO_4.2H_2O$, $MnSO_4.3H_2O$, $MnSO_4.4H_2O$, $MnCl_2$, $MnCl_2.4H_2O$, $MnBr_2$ and $MnBr_2.4H_2O$. Likewise, in place of the sodium dimethyl dithiocarbamate used in the specific example there can be substituted an equivalent amount of other alkali metal or alkaline earth metal dimethyl dithiocarbamates, such as potassium dimethyl dithiocarbamate, calcium dimethyl dithiocarbamate, strontium dimethyl dithiocarbamate or barium dimethyl dithiocarbamate. Preferably, a slight stoichiometric excess of the water-soluble dimethyl dithiocarbamate is used in performing the precipitation of the manganous salt, but for economic reasons the amount of the excess should not exceed about 5 percent.

I also prefer to add the alkali metal or alkaline earth metal dimethyl dithiocarbamate to the aqueous mixture containing the water-soluble manganous salt, rather than the reverse. The temperature at which the reaction is performed is not critical and can be varied widely, but I generally use reaction temperatures within the range from about 20 to 80° C. and preferably about 50 to 60° C. Further, although the amount of water present in the reaction mixture can be varied widely, I prefer that the relative amounts of water-soluble manganous salts, alkali metal or alkaline earth metal dimethyl dithiocarbamate and water initially present in the reaction mixture be such that the amount of manganous dimethyl dithiocarbamate precipitated be within the range from about 0.5 to about 0.75 pound per gallon of water.

After the manganous dimethyl dithiocarbamate has been formed by the reaction, the water-soluble salts can be separated from admixture therewith simply by washing with water. As the specific examples illustrate I preferably do this by stirring the impure salt with a quantity of water, thereafter permitting the salt to settle, and then decanting the supernatant liquid. This procedure is repeated until the soluble salts amount to less than about 0.25 percent, based upon the weight of the manganous dimethyl dithiocarbamate. After this has been done the manganous dimethyl dithiocarbamate can then be dried safely using conventional procedures, such as air drying at temperatures within the range from about 140 to about 160° F.

I claim:

1. A method for the preparation of manganous dimethyl dithiocarbamate which comprises reacting in aqueous solution substantially equivalent amounts of an inorganic, water-soluble manganous salt and a material selected from the group consisting of alkali metal dimethyl dithiocarbamates and alkaline earth metal dimethyl dithiocarbamates to precipitate manganous dimethyl dithiocarbamate, washing the precipitate with water without exposing the precipitate to air until the precipitate contains less than about 0.25 percent by weight of water-soluble salts, based upon the weight of manganous dimethyl dithiocarbamate, and thereafter drying the precipitate.

2. A method as in claim 1 in which said water-soluble manganous salt is a manganous sulfate.

3. A method as in claim 1 in which said material is sodium dimethyl dithiocarbamate.

4. A method as in claim 1 in which said precipitate is washed with water until it contains from 0.05 to 0.10 percent by weight of water-soluble salts, based upon the weight of manganous dimethyl dithiocarbamate.

5. A method as in claim 1 in which said water-soluble manganous salt is a manganous sulfate, in which said material is sodium dimethyl dithiocarbamate and in which said precipitate is washed with water until it contains from 0.05 to 0.10 percent by weight of water-soluble salts, based upon the weight of manganous dimethyl dithiocarbamate.

6. The method of claim 1 in which said material is an alkali metal salt of a mixture in the weight ratio of 91.9:8.1, respectively, of dimethyl dithiocarbamic acid and 2-mercaptobenzothiazole.

7. The method of claim 6 in which said water-soluble manganous salt is a manganous sulfate.

8. The method of claim 6 in which said precipitate is washed with water until it contains from 0.05 to 0.10 percent by weight of water-soluble salts, based upon the weight of manganous dimethyl dithiocarbamate.

References Cited in the file of this patent
UNITED STATES PATENTS

| | | |
|---|---|---|
| 2,286,738 | Hill | June 16, 1942 |
| 2,567,358 | Waletzky | Sept. 11, 1951 |